(12) United States Patent
Tucker et al.

(10) Patent No.: US 7,411,008 B2
(45) Date of Patent: Aug. 12, 2008

(54) INK FORMULATIONS AND USES THEREOF

(75) Inventors: Robert Carey Tucker, Arlington Heights, IL (US); Sandra Corti, Mt. Prospect, IL (US)

(73) Assignee: Novartis AG, Basel (CH)

( * ) Notice: Subject to any disclaimer, the term of this patent is extended or adjusted under 35 U.S.C. 154(b) by 16 days.

(21) Appl. No.: 10/287,730

(22) Filed: Nov. 4, 2002

(65) Prior Publication Data

US 2003/0119943 A1 Jun. 26, 2003

Related U.S. Application Data

(60) Provisional application No. 60/348,257, filed on Nov. 7, 2001.

(51) Int. Cl.
*C09D 11/00* (2006.01)

(52) U.S. Cl. .................................. 523/160; 523/161

(58) Field of Classification Search ................. 523/160, 523/161; 106/31.27, 31.6, 31.28; 524/556, 524/558, 557, 563, 555
See application file for complete search history.

(56) References Cited

U.S. PATENT DOCUMENTS

| | | | |
|---|---|---|---|
| 4,038,264 A | 7/1977 | Rostoker et al. | 260/79.3 |
| 4,981,487 A | 1/1991 | da Costa | 8/507 |
| 5,156,675 A | 10/1992 | Breton et al. | 106/22 |
| 5,508,317 A | 4/1996 | Muller | 522/85 |
| 5,518,534 A | 5/1996 | Pearlstine et al. | 106/20 R |
| 5,538,549 A * | 7/1996 | Kato et al. | 524/386 |
| 5,667,572 A | 9/1997 | Taniguchi et al. | 106/31.36 |
| 5,888,285 A | 3/1999 | Gundlach et al. | 106/31 |
| 5,926,195 A | 7/1999 | Domhoff et al. | 347/87 |
| 6,020,400 A * | 2/2000 | Anton et al. | 523/161 |
| 6,149,842 A | 11/2000 | Lally et al. | 264/1.36 |
| 6,248,162 B1 | 6/2001 | Gundlach et al. | 106/31.58 |
| 6,284,161 B1 | 9/2001 | Thakrar et al. | 264/1.7 |
| 6,315,410 B1 | 11/2001 | Doshi | 351/162 |
| 6,902,274 B2 * | 6/2005 | Tucker | 351/177 |
| 2001/0050753 A1 | 12/2001 | Tucker | 351/177 |
| 2002/0039172 A1 * | 4/2002 | Ocampo et al. | 351/162 |
| 2002/0086914 A1 * | 7/2002 | Lee et al. | 522/75 |
| 2002/0140900 A1 | 10/2002 | Streibig | 351/162 |
| 2003/0002011 A1 | 1/2003 | Streibig | 351/162 |
| 2003/0007122 A1 | 1/2003 | Streibig | 351/162 |
| 2003/0054109 A1 * | 3/2003 | Quinn et al. | 427/385.5 |

FOREIGN PATENT DOCUMENTS

| | | |
|---|---|---|
| EP | 0 472 496 | 8/1991 |
| EP | 0 482 836 A1 | 4/1992 |
| EP | 0 482 837 A1 | 4/1992 |
| EP | 0 216 074 | 6/1993 |
| EP | 0 189 375 | 6/1994 |
| EP | 0 482 837 B1 | 3/1995 |
| JP | 60-092368 | 5/1985 |
| JP | 60-130662 | 7/1985 |
| JP | 8112566 | 5/1996 |
| WO | WO 96/24076 A1 * | 8/1996 |
| WO | WO 99/26087 A1 * | 5/1999 |

OTHER PUBLICATIONS

International Search Report, (Dec. 3, 2003).
European Search Report, (Jun. 27, 2006).

* cited by examiner

*Primary Examiner*—Edward J. Cain
(74) *Attorney, Agent, or Firm*—Jian Zhou

(57) ABSTRACT

The present invention provides a chemical ink comprises a solvent, a binder polymer, a colorant and optionally a crosslinker. The ink of the invention has one or more of the following characteristics: a viscosity lower than about 50 centipoises; a surface tension of from about 20 mN/m to about 60 mN/m; a particle size of less than about 5 μm; prolonged stability; an appropriate color level (visible by eye); uniform drop formation; jet stability; good adhesion to contact lenses; good transfer from a mold to a lens made in the mold; and stability of ink in inkjet nozzles. The ink of the invention is useful for inkjet printing of a high-quality color image on a contact lens or a mold so as to produce a colored contact lens.

50 Claims, No Drawings

INK FORMULATIONS AND USES THEREOF

This application claims the benefit under 35 U.S.C. §119 (e) of U.S. provisional application Ser. No. 60/348,257 filed Nov. 7, 2001.

The present invention relates to an ink that can be applied by inkjet printing systems to contact lenses or to the molds that will be used to make contact lenses. In the latter case, the ink printed on the mold surface would be incorporated into the contact lens as constituent monomers of contact lens are then added to the mold and polymerized. In either case, the resultant product will be a contact lens to which colored ink has been applied. In addition, the present invention provides a method for making the ink of the present invention. Furthermore, the present invention is related to a method for making a colored contact lens.

BACKGROUND

For cosmetic purposes, contact lenses having one or more colorants dispersed in the lens or printed on the lens are in high demand. These colored contact lenses enhance the natural beauty of the eye, or provide unique patterns on the iris of the wearer, or provide non cosmetic patterns or marks, such as rotation marks, inversion marks, product/brand codes, lot numbers, "DEMO" lenses, and the like, which are of benefits to wearers, eye-care practitioners and manufacturers.

Presently, methods of printing inks onto contact lenses involve cliché ink transfer printing. A typical example of this printing follows. An image is etched into metal to form a cliché. The cliché is placed in a printer. Once in the printer, the cliché is inked by either an open inkwell doctoring system or by a closed ink cup sliding across the image. Then, a silicone pad picks up the inked image from the cliché and transfers the image to the contact lens. The silicone pads are made of a material comprising silicone that can vary in elasticity. The properties of the silicone material permit the inks to stick to the pad temporarily and fully release from the pad when it contacts the contact lens.

There are several disadvantages associated with using cliché ink transfer printing to color contact lenses. This method lacks consistency. Slight differences in the silicone pad can cause wide variation in image quality, effecting dot resolution and color reproducibility. Further, multiple color layering is difficult and time consuming. Further still, the design and printing process using this method is slow. After an image is fully designed, it can take about two weeks before that image is etched onto a cliché. The set-up is painstakingly detailed and lengthy when more than one color is going to be printed on the lens using this method. The difficulty and slowness of this printing method inhibits business strategies, making it difficult to offer consumers a chance to design and print their own contact lenses at the point of purchase.

Ink-jet printing method may be used to replace the above-mentioned methods for printing colored images with high quality on a contact lens. However, inkjet inks known in the art are not suitable for printing colored images on a contact lens because they may not meet some basic requirements, such as highly opaque without leaching of any harmful residuals, rub-resistant, smooth, and health safety.

A number of inks is known in the art for cliché ink transfer printing of color images on a contact lens. Examples of such inks include those disclosed in U.S. Pat. Nos. 4,668,240, 4,857,072, 5,272,010, and 5,414,477. Such inks known in the art are either incompatible with currently-available inkjet printing systems or incapable of producing a high quality color image on a contact lens when using an inkjet printing system.

Therefore, there are needs for inks suitable for printing a high-quality color image on a contact lens using an inkjet printing system. There are also needs for methods for making such inks.

SUMMARY OF THE INVENTION

The inks of the present invention address at least some of the difficulties in the prior art.

In one aspect of the invention, an ink comprises a solvent, a binder polymer, a colorant and optionally a crosslinker. The ink of the invention has one or more of the following characteristics: a viscosity lower than about 50 centipoise (cps), preferably lower than about 15 cps; a surface tension of from about 20 mN/m to about 60 mN/m; a particle size of less than about 5 µm; prolonged stability (i.e., stable for at least 4 hours, preferably at least 8 hours, more preferably at least 24 hours, even more preferably at least 7 days, most preferably at least three weeks); an appropriate color level (visible by eye); uniform drop formation (i.e., no "coffee stain" or "donut" effects); jet stability (i.e., ease of formation of individual drops); good adhesion to medical devices; good transfer from a mold to a medical device made in the mold; and stability of ink in inkjet nozzles (minimal drying or crusting effects).

In another aspect of the invention, a method for making an ink of the invention comprises grinding a pigment in a liquid mixture comprising water and a binder polymer. The binder polymer can be a poly(vinyl alcohol) or a derivative of poly (vinyl alcohol).

The present invention provides the foregoing and other features, and the advantages of the invention will become further apparent from the following detailed description of the presently preferred embodiments, read in conjunction with the accompanying figures. The detailed description and figures are merely illustrative of the invention and do not limit the scope of the invention, which is defined by the appended claims and equivalents thereof.

DESCRIPTION OF THE PREFERRED EMBODIMENTS

In general, the present invention is directed to an ink useful for printing a color image on a medical device, preferably for producing colored ophthalmic lenses, more preferably for producing colored contact lenses.

A "medical device" refers to a device having surfaces that contact tissue, blood, or other bodily fluids of patients in the course of their operation. Exemplary medical devices include: (1) extracorporeal devices for use in surgery such as blood oxygenators, blood pumps, blood sensors, tubing used to carry blood and the like which contact blood which is then returned to the patient; (2) prostheses implanted in a human or animal body such as vascular grafts, stents, pacemaker leads, heart valves, and the like that are implanted in blood vessels or in the heart; (3) devices for temporary intravascular use such as catheters, guide wires, and the like which are placed into blood vessels or the heart for purposes of monitoring or repair; and (4) ophthalmic lenses.

"An ophthalmic lens", as used herein, refers to a contact lens (hard or soft), or an intraocular lens.

An "colored ophthalmic lens" refers to an ophthalmic lens having a color image thereon. A "colored contact lens" refers to a contact lens (hard or soft) having a color image printed thereon. A color image can be a cosmetic pattern, for example, iris-like patterns, WILD EYE™ patterns, made-to-order (MTO) patterns, and the like; an inversion mark that allows a user to handle and insert easily a contact lens, for example, a FRESHLOOK™ contact lens (CIBA Vision); or contact lenses stock keeping units (SKUs), for example, either in forms of numbers or as bar codes. A color image can be a single color image or a multi-color image. A color image is preferably a digital image, but it can also be an analog image.

Methods for making colored contact lenses are well known in the art. Typically, a color can be printed directly on a contact lens to produce a color contact lens. Alternatively, a color image can be printed first on a mold for making a contact lens and then a polymerizable liquid mixture in the mold is cured to form a color contact lens onto which the color image is transferred from the mold. The method involving printing a color image on a mold is a preferred approach for making a color contact lens, since this approach may produce a colored contact lens with smooth surface that may provide more comfort to a wearer.

The present invention is related more specifically to an ink for inkjet printing of a color image on an ophthalmic lens, preferably a contact lens, or a mold for making a contact lens.

The ink of the present invention has a surface tension of from about 20 mN/m to 60 mN/m. The surface tension of an ink is a good indicator of drop spreading. The ink must spread and diffuse into the surface when it hits a contact lens or a mold for making a contact lens. The more a drop spreads, the lighter the dot color appears. Preferably, little spreading should occur to maximize color intensity and minimize multi-drop coalescence.

The surface tension of an in ink needs to be optimized for a given surface to be printed thereon. To minimize spreading, a hydrophobic surface needs an ink with a high surface tension, while a hydrophilic surface needs an ink with a low surface tension. The surface tension also affects jetting properties. An ink having a high surface tension can have a hard time jetting properly and would be more difficult to form drops (jet stability), especially drops having a volume of 200 picoliters or less. An ink with a low surface tension can have a propensity to "dribble" out of the nozzle. Furthermore, an ink with low surface tension can produce a color dot having a coffee stain, donut-like or other non-uniform appearance on a contact lens or mold.

"Coffee stain appearance" or "coffee stain effect", as used herein, means that a color dot on a contact lens or a mold has a peripheral edge having a dark color and the interior area having light color.

"Donut appearance" or "donut effect", as used herein, means that a color dot on a contact lens or a mold has a light-colored or colorless central zone surrounded by a dark-colored annular zone.

It is discovered that an ink having a surface tension of from about 20 mN/m to 60 mN/m can produce a print with good quality (i.e., uniform drop formation, good jet stability, and color dots with adequate color intensity). For better print quality, an ink preferably has a surface tension of from about 25 mN/m to 60 mN/m and more preferably has a surface tension of from about 30 mN/m to 55 mN/m.

The surface tension of an ink can be adjusted by any known suitable means. For example, for an aqueous-based ink, the surface tension can be decreased by adding surfactants or a water miscible co-solvent. A person skilled in the art will know how to adjust the surface tension of an ink.

The ink of the present invention also has a viscosity of 50 centipoise or less. In order for an inkjet printer to jet an ink, the viscosity of the ink is required to be less than 50 centipoise. A preferred embodiment of the ink viscosity is 30 centipoise or less. A more preferred embodiment of the ink viscosity is 15 centipoise or less.

The ink of the present invention also has good adhesion to a medical device, preferably an ophthalmic lens, more preferably a contact lens. As used herein, "good adhesion to a medical device" in reference to an ink means that a color image printed with the ink on a medical device can pass at least a finger rubbing test, preferably pass the finger rubbing test and a sterilization-surviving test.

The finger rubbing test is performed by removing the hydrated contact lens from a packaging solution, e.g., saline, and digitally rubbing the lens between either two fingers or a finger and a palm for approximately 10 seconds. Visible and microscopic (~10×) observation of colorant bleeding, smearing, or delamination indicates failure of the rub test.

Production of medical devices including contact lenses always involve a step of sterilization, such as autoclave, or irradiation with UV light, x-ray, or the like. "Passing a sterilization-surviving test" means that no significant decoloring or delamination or the like can be observed after sterilization. For example, an autoclave-surviving test can be performed by removing a sterilized contact lens from a packaging solution, e.g., saline, and immersing it into a vial of methanol. The vial containing the hydrated contact lens and methanol is sonicated for 30 seconds using a standard laboratory sonicator. The lens is then removed from the methanol and placed back into the packaging solution. A finger rubbing test is performed on this lens. Observation of bleeding, smearing, or delamination indicates failure of this test.

In a preferred embodiment, the ink of the present invention has a good transferability from a mold to a medical device. A "good transferability from a mold to a medical device" in reference to an ink means that a color image printed on a mold with the ink can be transferred completely onto a medical device cured in that mold.

In another preferred embodiment, the ink of the present invention is stable for at least 4 hours. More preferably, the ink is stable for at least eight hours. Even more preferably, the ink is stable for at least two days. Most preferably, the ink is stable for at least one week or for at least three weeks.

"Stable" in reference to an ink, as used herein, means that no liquid phase separation and/or pigment precipitation and/or increase of viscosity occurs over a specific time period. A stable ink can provide more flexibility in producing colored ophthalmic lenses.

The ink of the present invention typically comprises a solvent, a colorant, and a binder polymer.

A solvent can be water or any appropriate organic or inorganic solvent. Any known suitable solvents can be used, so long as they can dissolve the binder in the ink of the invention and aid in the stability of the colorant. Exemplary solvents include, without limitation, water, acetone, alcohols (e.g., methanol, ethanol, propanol, isopropanol, etc.), glycols, ketones, esters, cyclopentanone, cyclohexanone, tetrahydrofuran, acetone, methyl-2-pyrrolidone, dimethyl formamide, acetophenone, methylene dichloride, dimethyl sulfoxide, gamma-butyrolactone, ethylene dichloride, isophorone, o-dichlorobenzene, tetrahydrofuran, diacetone alcohol, methyl ethyl ketone, acetone, 2-nitropropane, ethylene glycol monoethyl ether, propylene carbonate, cyclohexanol, chloroform, trichloroethylene, 1,4-dioxane, ethyl acetate, ethylene glycol monobutyl ether, chlorobenzene, nitroethane, ethylene glycol monomethyl ether, butyl acetate, 1-butanol, methyl isobutyl ketone, nitromethane, toluene, ethanol, diethylene glycol, benzene, diethyl ether, ethanolamine, carbon tetrachloride, propylene glycol, hexane, ethylene glycol, and formamide.

A solvent in the ink of the invention can also be a mixture of several organic solvents or a mixture of water and one or more water soluble or water miscible organic components, such as ethylene glycol, propylene glycol, diethylene glycol, glycerine, dipropylene glycol, polyethylene glycol, polypropylene glycol, amides, ethers, urea, substituted ureas, carboxylic acids and their salts, esters, alcohols, organosulfides, organosulfoxides, sulfones (such as sulfolane), alcohol derivatives, carbitol, butyl carbitol, cellosolve, tripropylene glycol monomethyl ether, ether derivatives, amino alcohols, ketones, N-methylpyrrolidinone, 2-pyrrolidinone, cyclohexylpyrrolidone, hydroxyethers, sulfoxides, lactones, polyelectrolytes, methyl sulfonylethanol, imidazole, betaine, and other water soluble or water miscible materials, as well as mixtures thereof.

A preferred embodiment of the solvent is water, water mixed with one or more co-solvent, alcohols, glycols, ketones, esters, methyl ethyl ketone, cyclopentanone, and cyclohexanone. A more preferred embodiment of the solvent is water, water/ethanol, water/isopropanol, water/glycerol, water/diethylene glycol, cyclopentanone, and cyclohexanone.

A "colorant" means either a dye or a pigment or a mixture thereof that is used to print a color image on an article.

"Dye" means a substance that is soluble in a solvent and that is used to impart color. Dyes are typically translucent and absorb but do not scatter light. Dyes can cover both optical regions of contact lenses and non-optical regions of contact lenses. Nearly any dye can be used in the present invention, so long as it can be used in an apparatus as described below. These dyes include fluorescent dyes, phosphorescent dyes, pearlescent dyes, and conventional dyes.

"Fluorescence" means luminescence caused by absorption of visible light or ultraviolet radiation at one wavelength followed by nearly immediate emission at a longer wavelength. Fluorescent emission ceases almost immediately when the light or incident ultraviolet radiation stops.

"Phosphorescence" is luminescence caused by the absorption of radiation at one wavelength followed by delayed emission at a different wavelength. Phosphorescent emission continues for a prolonged time after the incident radiation stops.

"Pearlescence" means having a pearly luster; resembling a pearl in physical appearance; or having a nearly neutral slightly bluish medium gray color.

A "Pigment" means a powdered substance that is suspended in a liquid in which it is insoluble. Pigments are used to impart color. Pigments, in general, are more opaque than dyes. For this reason, it is preferred that pigments are located in non-optical regions of a contact lens.

A pigment can be a fluorescent pigment, phosphorescent pigment, pearlescent pigment, or conventional pigment. While any suitable pigment may be employed, it is presently preferred that the pigment be heat resistant, non-toxic and insoluble in aqueous solutions. Pigments may include (based upon the color index name), without limitations: PY1, PY3, PY34, PY35, PY37, PY40, PY53, PY65, PY83, PY95, PY97, PY108, PY110, PY120, PY138, PY 139, PY150, PY151, PY153, PY154, PY175, PY184, PR60, PR83, PR88, PR122, PR171, PR176, PR177, PR202, PR264, NR4, NR9, PV11, PV19, PV42, PB15:1, PB15:3, PB15:6, PB16, PB17, PB27, PB28, PB29, PB33, PB35, PB36, PB60, PB72, PB73, PB74, PBk1, PBk6, PBk7, PBk8, PBk9, PBk10, PBk11, PBk19, PBk31, PW4, PW6, D&C Blue No. 6, D&C Green No. 6, D&C Violet No. 2, carbazole violet, phthalocyanine green, certain copper complexes, certain chromium oxides, and various iron oxides. Examples of preferred pigments include any colorant permitted in medical devices and approved by the FDA, such as D&C Blue No. 6, D&C Green No. 6, D&C Violet No. 2, carbazole violet, certain copper complexes, certain chromium oxides, various iron oxides, phthalocyanine green, phthalocyanine blue, titanium dioxides, etc. See Marmiom DM Handbook of U.S. Colorants for a list of colorants that may be used with the present invention. A more preferred embodiment of a pigment include (C.I. is the color index no.), without limitation, for a blue color, phthalocyanine blue (pigment blue 15:3, C.I. 74160), cobalt blue (pigment blue 36, C.I. 77343), Toner cyan BG (Clariant), Permajet blue B2G (Clariant); for a green color, phthalocyanine green (Pigment green 7, C.I. 74260) and chromium sesquioxide; for yellow, red, brown and black colors, various iron oxides; PR122, PY154, for violet, carbazole violet; for black, Monolith black C-K (CIBA Specialty Chemicals).

Nearly any pigment can be used in the present invention, so long as it can be used in an inkjet printing system. Pigment(s) should be much smaller than a nozzle of a printer head to prevent clogging during the printing process. Generally, this means that preferred pigments are 3 microns or smaller. More preferably, a pigment is less than one micron. Larger pigments can be ground into smaller particles to reduce potential clogging. Preferred methods of reducing a pigment's particle size include high speed mixers, Kady Mills, colloid mills, homogenizers, microfluidizers, sonalators, ultrasonic mills, roll mills, ball mills, roller mills, vibrating ball mills, attritors, sand mills, varikinetic dispensers, three-roll mills, Banbury mixers, or other methods well known to those of skill in the art.

In general, dyes may not provide a highly opaque print that pigment can provide. Preferably, a colorant in an ink of the invention comprises at least one pigment. A colorant also may be a mixture of two or more pigments, which in combination provides a desired color, since any color can be obtained by merely mixing two or more primary colors together, As defined herein, "primary colors" mean cyan, yellow, magenta, white, and black. A colorant may also be a mixture of at least one pigment and at least one dye. A person skill in the art will know how to select colorants.

"A binder polymer" refers to a crosslinkable polymer that can be crosslinked by a crosslinker or upon initiation by a chemical or physical means (e.g., moisture, heating, UV irradiation or the like) to trap or bind colorants onto or into a medical device (preferably a contact lens) such as that term is known in the art.

Typical binder polymers have crosslinkable groups. The term crosslinkable groups is employed herein in a broad sense and is intended to encompass, for example, functional groups and photo crosslinkable or thermally crosslinkable groups, which are well-known to a person skilled in the art. It is well known in the art that a pair of matching crosslinkable groups can form a covalent bond or linkage under known reaction conditions, such as, oxidation-reduction conditions, dehydration condensation conditions, addition conditions, substitution (or displacement) conditions, free radical polymerization conditions, 2+2 cyclo-addition conditions, Diels-Alder reaction conditions, ROMP (Ring Opening Metathesis Polymerization) conditions, vulcanization conditions, cationic crosslinking conditions, and epoxy hardening conditions. For example, an amino group is covalently bondable with aldehyde (Schiff base which is formed from aldehyde group and amino group may further be reduced); an hydroxyl group and an amino group are covalently bondable with carboxyl group; carboxyl group and a sulfo group are covalently bondable with hydroxyl group; a mercapto group is covalently bondable with amino group; or a carbon-carbon double bond is covalently bondable with another carbon-carbon double bond.

Exemplary covalent bonds or linkages, which are formed between pairs of crosslinkable groups, include without limitation, alkane (carbon-carbon single bond), alkene (carbon-carbon double bond), ester, ether, acetal, ketal, vinyl ether, carbamate, urea, amine, amide, enamine, imine, oxime, amidine, iminoester, carbonate, orthoester, phosphonate, phosphinate, sulfonate, sulfinate, sulfide, sulfate, disulfide, sulfinamide, sulfonamide, thioester, aryl, silane, siloxane, heterocycles, thiocarbonate, thiocarbamate, and phosphonamide.

Exemplary crosslinkable groups include, without limitation, hydroxyl group, amine group, amide group, sulfhydryl group, —COOR (R and R' are hydrogen or $C_1$ to $C_8$ alkyl groups), halide (chloride, bromide, iodide), acyl chloride, isothiocyanate, isocyanate, monochlorotriazine, dichlorotriazine, mono- or di-halogen substituted pyridine, mono- or di-halogen substituted diazine, phosphoramidite, maleimide, aziridine, sulfonyl halide, hydroxysuccinimide ester, hydroxysulfosuccinimide ester, imido ester, hydrazine, axidonitrophenyl group, azide, 3-(2-pyridyl dithio)proprionamide, glyoxal, aldehyde, epoxy, olefinically unsaturated radicals.

The term "olefinically unsaturated radicals" is employed herein in a broad sense and is intended to encompass, for example, vinyl compounds, acrylic compounds, and methacrylic compounds. A free radical can be introduced into the olefinically unsaturated group-containing compounds using standard initiating agents, such as a photo or thermal initiator.

A binder polymer in the ink of the invention can be any polymer which is compatible with lens material, for example, hydrogels for soft contact lenses. A binder polymer can be prepared by polymerization of monomers containing vinyl alcohol, vinyl butyral, vinyl acetate, acrylic acid, methacrylic acid, hydroxy $C_1$ to $C_6$ alkyl ester of acrylic acid and methacrylic acid, amino $C_1$ to $C_8$ alkyl ester of acrylic and methacrylic acid, glycerol esters of acrylic and methacrylic acid, vinylpyrrolidone, vinylchloride, hydroxyethyl methacrylate, dimethylacrylamide, and the like. Mixtures of these different monomers could be made to form various copolymers. Other polymers could include various cellulosic resins, polyesters, polyurethanes, polyureas, or polyamides that have at least one crosslinkable group.

"Hydrogel" means a cross-linked polymer having an equilibrium content between about 10 and 90 percent water.

A "monomer" means a low molecular weight compound that can be polymerized. Low molecular weight typically means average molecular weights less than 700 Daltons. The term "monomer" also refers to medium and high molecular weight compounds or polymers, sometimes referred to as macromonomers (that is, typically having number average molecular weights greater than 700) containing functional groups capable of further polymerization.

"Polymer" means a material formed by polymerizing one or more monomers.

A large number of binder polymers can be used. However, a binder polymer should be soluble in a solvent or a mixture of solvents used in an ink formulation.

In a preferred embodiment, a binder polymer comprises multiple crosslinkable groups, which are capable of forming inter- and intra crosslinkages with other crosslinkable groups of the same type or different type so that a macromolecular matrix can be formed to bind or trap pigments onto a medical device.

A "intra-crosslinkage" as used herein refers to an intramolecular covalent bond or linkage via a crosslinker, which is formed between a pair of crosslinkable groups which belong to the same binder polymer molecule.

"Inter-crosslinkage" as used herein refers to an intermolecular covalent bond or linkage via a crosslinker, which is formed between a pair of crosslinkable groups each belonging to one of two binder polymer molecules.

A "macromolecular matrix" refers to a high-molecular weight polymer having a mesh or network structure.

Where the ink of the invention comprises an organic solvent, such as methyl ethyl ketone, cyclohexanone or cyclopentanone or a mixture of thereof, examples of a preferred binder polymer include, without limitation, crosslinkable copolymers prepared from one of the following pairs of monomers: hydroxyethyl methacrylate (HEMA)/ethoxyethyl methacrylate (EOEMA); vinyl alcohol/vinyl butyral; vinyl alcohol/vinyl acetate; methyl methacrylate (MMA)/HEMA; MMA/N,N-dimethylacrylamide (DMA); and MMA/N-vinyl-2-pyrrolidone (NVP). More preferably, a binder polymer is a crosslinkable copolymer having a low average molecular weight, which can make an ink having a viscosity of 50 cps or less. A person skilled in the art knows how to control a molecular weight of a polymer, for example, by varying polymerization reaction conditions or adding additives such as chain transfer agents (e.g., 2-mercaptoethanol).

Where the ink of the invention comprises water or a mixture of water and one or more water soluble or miscible organic solvents, a binder polymer is preferably a crosslinkable, water-soluble poly(vinyl alcohol). More preferably, a binder polymer is a crosslinkable polymer based on a polyhydroxyl compound which is a derivative of a poly(vinyl alcohol) having a molecular weight of at least about 2000 which comprises from about 0.5 to about 80%, based on the number of hydroxyl groups in the poly(vinyl alcohol), of units of the formula I, I and II, I and III, or I and II and III

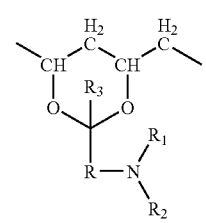

I

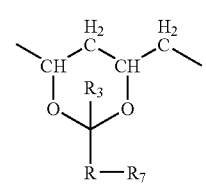

II

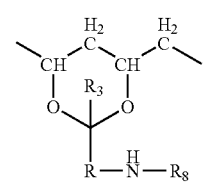

III

In formula I, II and III, $R_3$ is hydrogen, a $C_1$-$C_6$ alkyl group or a cycloalkyl group.

In formula I, II and III, R is alkylene having up to 12 carbon atoms, preferably up to 8 carbon atoms, and can be linear or branched. Suitable examples include octylene, hexylene, pentylene, butylene, propylene, ethylene, methylene, 2-propylene, 2-butylene and 3-pentylene. Lower alkylene R preferably has up to 6, particularly preferably up to 4 carbon atoms. Methylene and butylene are particularly preferred.

In the formula I, $R_1$ is hydrogen or lower alkyl having up to seven, in particular up to four, carbon atoms. Most preferably, $R_1$ is hydrogen.

In the formula I, $R_2$ is an olefinically unsaturated, electron-withdrawing, crosslinkable radical, preferably having up to 25 carbon atoms. In one embodiment, $R_2$ is an olefinically unsaturated acyl radical of the formula $R_4$—CO—, in which $R_4$ is an olefinically unsaturated, crosslinkable radical having 2 to 24 carbon atoms, preferably having 2 to 8 carbon atoms, particularly preferably having 2 to 4 carbon atoms.

The olefinically unsaturated, crosslinkable radical $R_4$ having 2 to 24 carbon atoms is preferably alkenyl having 2 to 24 carbon atoms, in particular alkenyl having 2 to 8 carbon atoms, particularly preferably alkenyl having 2 to 4 carbon atoms, for example ethenyl, 2-propenyl, 3-propenyl, 2-butenyl, hexenyl, octenyl or dodecenyl. Ethenyl and 2-propenyl are preferred, so that the —CO—$R_4$ group is the acyl radical of acrylic acid or methacrylic acid.

In another embodiment, the radical $R_2$ is a radical of the formula IV, preferably of the formula V

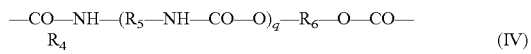

(IV)

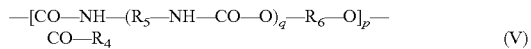

(V)

in which p and q, independently of one another, are zero or one, and $R_5$ and $R_6$, independently of one another, are lower alkylene having 2 to 8 carbon atoms, arylene having 6 to 12 carbon atoms, a saturated bivalent cycloaliphatic group having 6 to 10 carbon atoms, arylenealkylene or alkylenearylene having 7 to 14 carbon atoms or arylenealkylenearylene having 13 to 16 carbon atoms, and in which $R_4$ is as defined above.

Lower alkylene $R_5$ or $R_6$ preferably has 2 to 6 carbon atoms and is, in particular, linear. Suitable examples include propylene, butylene, hexylene, dimethylethylene and, particularly preferably, ethylene.

Arylene $R_5$ or $R_6$ is preferably phenylene, which is unsubstituted or substituted by lower alkyl or lower alkoxy, in particular 1,3-phenylene or 1,4-phenylene or methyl-1,4-phenylene.

A saturated bivalent cycloaliphatic group $R_5$ or $R_6$ is preferably cyclohexylene or cyclohexylene(lower alkylene), for example cyclohexylenemethylene, which is unsubstituted or substituted by one or more methyl groups, for example trimethylcyclohexylenemethylene, for example the bivalent isophorone radical.

The arylene unit of alkylenearylene or arylenealkylene $R_5$ or $R_6$ is preferably phenylene, unsubstituted or substituted by lower alkyl or lower alkoxy, and the alkylene unit thereof is preferably lower alkylene, such as methylene or ethylene, in particular methylene. Radicals $R_5$ or $R_6$ of this type are therefore preferably phenylenemethylene or methylenephenylene.

Arylenealkylenearylene $R_5$ or $R_6$ is preferably phenylene (lower alkylene)phenylene having up to 4 carbon atoms in the alkylene unit, for example phenyleneethylenephenylene.

The radicals $R_5$ and $R_6$ are preferably, independently of one another, lower alkylene having 2 to 6 carbon atoms, phenylene, unsubstituted or substituted by lower alkyl, cyclohexylene or cyclohexylene(lower alkylene), unsubstituted or substituted by lower alkyl, phenylene(lower alkylene), (lower alkylene)phenylene or phenylene(lower alkylene)phenylene.

In the formula II, $R_7$ is a primary, secondary or tertiary amino group or a quaternary amino group of the formula $N^+(R')_3X^-$, in which each R', independently of the others, is hydrogen or a $C_1$-$C_4$ alkyl radical and X is a counterion, for example $HSO_4^-$, $F^-$, $Cl^-$, $Br^-$, $I^-$, $CH_3COO^-$, $OH^-$, $BF^-$, or $H_2PO_4^-$.

The radicals $R_7$ are, in particular, amino, mono- or di(lower alkyl)amino, mono- or diphenylamino, (lower alkyl)phenylamino or tertiary amino incorporated into a heterocyclic ring, for example —$NH_2$, —NH—$CH_3$, —$N(CH_3)_2$, —NH $(C_2H_5)$, —$N(C_2H_5)_2$, —NH(phenyl), —$N(C_2H_5)$phenyl or

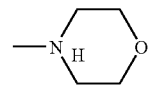

In the formula III, $R_8$ is the radical of a monobasic, dibasic or tribasic, saturated or unsaturated, aliphatic or aromatic organic acid or sulfonic acid. Preferred radicals $R_8$ are derived, for example, from chloroacetic acid, succinic acid, glutaric acid, adipic acid, pimelic acid, maleic acid, fumaric acid, itaconic acid, citraconic acid, acrylic acid, methacrylic acid, phthalic acid and trimellitic acid.

For the purposes of this invention, the term "lower" in connection with radicals and compounds denotes, unless defined otherwise, radicals or compounds having up to 7 carbon atoms, preferably having up to 4 carbon atoms.

Lower alkyl has, in particular, up to 7 carbon atoms, preferably up to 4 carbon atoms, and is, for example, methyl, ethyl, propyl, butyl or tert-butyl.

Lower alkoxy has, in particular, up to 7 carbon atoms, preferably up to 4 carbon atoms, and is, for example, methoxy, ethoxy, propoxy, butoxy or tert-butoxy.

The bivalent group —$R_5$—NH—CO—O— is present if q is one and absent if q is zero. Polymers containing a crosslinkable group in which q is zero are preferred.

The bivalent group —CO—NH—($R_5$—NH—CO—O) q—$R_6$—O— is present if p is one and absent if p is zero. Polymers containing a crosslinkable group in which p is zero are preferred.

In the polymers comprising units containing a crosslinkable group in which p is one, the index q is preferably zero. Particular preference is given to polymers comprising a crosslinkable group in which p is one, the index q is zero and $R_5$ is lower alkylene.

In the formula $N^+(R')_3X^-$, R' is preferably hydrogen or $C_1$-$C_3$ alkyl, and X is halide, acetate or phosphite, for example —$N^+(C_2H_5)_3CH_3COO^-$, —$N^+(C_2H_5)_3Cl^-$, and —$N^+ (C_2H_5)_3 H_2PO_4^-$.

Such crosslinkable polymers comprising units of the formula I, I and II, I and III, or I and II and III can be prepared in a manner known per se. For example, U.S. Pat. Nos. 5,583, 163 and 6,303,687 disclose and teach how to prepare crosslinkable polymers comprising units of the formula I, I and II, I and III, or I and II and III.

Advantage of using poly(vinyl alcohol)s or above-described derivatives of poly(vinyl alcohol)s as binder polymers is that these binder polymers can also function like a dispersing agent to suspend many pigments over a wide range of viscosities. A "dispersing agent" or "dispersant" refers to a surface-active substance added to a suspension to improve the separation of particles and to prevent settling or clumping.

The ink of the invention can optionally include a crosslinker. A "crosslinker" refers to a compound comprising two or more functional groups as they are known in the art. A crosslinker molecule can be used to crosslink two or more monomers or polymer molecules.

Many different crosslinking reactions could be used to cause chemical bonding between different binder molecules to entrap the pigmented particles. Most crosslinkers are identified by bi- or multi-functional reactive groups. For example, diphenolic, diepoxide, dimelamine, diisocyanate, diacrylate, or dialdehyde resins could be used. Multi-functional phenolics have structures as follows: $(HOH_2CPh)_n$—$R_9$, where Ph is a phenol group. Multi-functional epoxides have structures as follows: $(CH_2OCH)_n$—$R_9$. Multi-functional aldehydes have the following structure: $(HCO)_n$—$R_9$ or $(CH_3CO)_n$—$R_9$. Multi-functional diacrylates include the following: $(H_2CCR_{10}COO)_n$—$R_9$, where $R_{10}$ is a —H or —$CH_3$. Multi-functional isocyanates have the following structure: $(OCN)_n$—$R_9$. Diazonium and tetrazonium salts could be used as crosslinking compounds. Melamine resins have the following structure: $(HOH_2C\text{-Mel})_n$—$R_9$, where Mel is

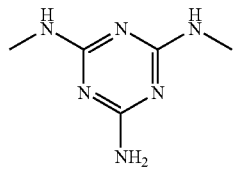

For these examples, $R_9$ may be a aliphatic, alicyclic, aliphatic-alicyclic, aromatic, aliphatic-aromatic hydrocarbon, vinyl alcohol, vinyl butyral, or vinyl acetate, and n is a number greater than 1. Mixed functional groups could be used (i.e. an epoxide with an isocyanate).

Exemplary isocyanate compounds include hexamethylene diisocyanate, 2,4-toluene diisocyanate and bis(isocyanato pheyl)methane.

Exemplary epoxide-containing groups include bisphenol, diepoxide, and epichlorhydrin.

Other functional groups could be used containing two or more —$CH_2$—O—$R_{11}$, wherein $R_{11}$ is hydrogen or $C_1$ to $C_{16}$ alkyl, and said $CH_2$—O—$R_{11}$ groups are attached to a carbon atom that is part of an aromatic ring, or attached to a nitrogen or oxygen atom.

Exemplary preferred crosslinkers include, without limitation, hexamethyl diisocyanate (HMDI), ethylene glycol dimethacrylate (EGDMA), diethylene glycol dimethacrylate, ethyleneglycol diacrylate, allyl methacrylates, allyl acrylates, 1,3-propanediol dimethacrylate, 1,6-hexanediol dimethacrylate, 1,4-butanediol dimethacrylate, polyethyleneoxide mono- and diacrylates, and 1,4-butanediol diacrylate (BDDA).

In a preferred embodiment, the ink of the invention further comprises a surfactant. The term "surfactant", as used herein, refers to a surface-active compound as that term is known in the art, such as, for example, Surfynol 420 and Surfynol 104 (from Air Products), Pluronic F108 and F38 (from BASF). A surfactant can have one ore more of the following functions: to adjust the surface tension of an ink, to defoam, to improve the separation of pigment particles, and to prevent settling or clumping of pigment particles.

Preferably, the surfactant is Surfynol 420. The amount of Surfynol 420 presently in an ink formulation is preferably in a range from about 0.02% by weight to about 0.5% by weight, more preferably from 0.07% by weight to about 0.3% by weight. Where the concentration is in the range between 0.02% by weight to 0.3% by weight, Surfynol 420 can lower the surface tension of an aqueous-based ink comprising poly (vinyl alcohol) as binder polymer without increasing the viscosity of the ink.

In another preferred embodiment, the ink of the invention further comprises one or more humectants. A "humectant" refers to a compound that removes water (or humidity) from ink such as that term is known in the art. Examples of humectant include glycerol, ethylene glycol, diethylene glycol, and 1,3-dioxane-5,5-dimethanol. By adding one or more humectants (e.g., glycerol and diethylene glycol), clogging of the nozzles of a printer head can be minimized.

It is discovered that in an aqueous based ink of the invention, addition of glycerol (between 0 and 4%) can improve jet formation by increasing drying time. However, too much can cause problems with the method involving first printing on a mold and then transferring from the mold to a lens. The ink must dry before filling the mold with the lens-forming polymerizable liquid mixture and closing the mold. If an ink comprising too much glycerol is not dried before filling and closing, the ink tends to smear and bleed during the filling and closing. Addition of diethylene glycol can improve the print quality by minimizing coffee stain effect.

In a preferred embodiment, the ink of the invention further comprises: 0 to 4%, preferably 0 to 2% by weight glycerol; and 0 to 15%, preferably 2% to 5% by weight diethylene glycol. More preferably, the total amount of humectants in an ink should not exceed 5% by weight.

The ink of the invention can further comprise one or more components selected from the group consisting of polymerization initiators, antimicrobial agents, antioxidant agents, anti-kogating agents, and other additives known in the art.

"A polymerization initiator" refers to a chemical that can start a polymerization reaction. A polymerization initiator can be a photoinitiator or a thermal initiator. A photoinitiator is a chemical that initiates polymerization reaction by the use of light. Suitable photoinitiators are benzoin methyl ether, diethoxyacetophenone, a benzoylphosphine oxide, 1-hydroxycyclohexyl phenyl ketone and Darocur and Irgacur types, preferably Darocur 1173.RTM., Darocur 2959.RTM., and CIBA IRGACURE 2959. A thermal initiator is a chemical that initiates polymerization reaction by the use of heat energy. Examples of suitable thermal initiators include, but are not limited to, 2,2'-azobis (2,4-dimethylpentanenitrile), 2,2'-azobis (2-methylpropanenitrile), 2,2'-azobis (2-methylbutanenitrile), peroxides such as benzoyl peroxide, and the like. Preferably, the thermal initiator is azobisisobutyronite (AIBN).

"A anti-kogating agent" refers to a chemical that can reduce deposits known as "kogation" being formed on the exposed surface of the heater element (resistor element) in thermal ink-jet printers. "Kogation" is commonly defined as the build-up of residue (koga) on the resistor surface.

Some suitable antimicrobial materials include polyquaternary ammonium compounds, such as those described in U.S. Pat. No. 3,931,319 to Green et al. (e.g. "POLYQUAT"), which is incorporated herein by reference. Other antimicrobial or antibacterials that can be utilized in the present invention are peptides, other polyquats, mucin, mucin mimics, glycopeptides, glycoproteins, silk proteins, cellulose, dextran or other anti-microbial or anti-bacterial entities. Still other examples of such anti-bacterials or ant-microbials are disclosed in U.S. Pat. No. 5,866,113 to Hendriks et al. and U.S. Pat. No. 5,891,506 to Keogh, which are incorporated herein by reference.

In one embodiment of the invention, an ink formulation comprises: a solvent in an amount of from about 60% and 99% by weight, preferably from about 70% and 95% by weight, more preferably from about 84% and 94% by weight; a binder polymer in an amount of from about 1% to about 30% by weight, preferably from about 1% to about 15% by weight, more preferably from about 5% to about 10% by weight; and a colorant in an amount of from about 0 to about 15% by weight, preferably from about 0.5% to about 8% by weight, more preferably from about 0.5% to 5% by weight.

In a preferred embodiment of the invention, an ink formulation comprises: a solvent in an mount of from about 60% and 99% by weight, preferably from about 70% and 95% by weight, more preferably from about 84% and 94% by weight; a binder polymer in an amount of from about 1% to about 30% by weight, preferably from about 1% to about 15% by weight, more preferably from about 5% to about 10% by weight; a colorant in an amount of from about 0 to about 15% by weight, preferably from about 0.5% to about 8% by weight, more preferably from about 0.5% to 5% by weight; and a crosslinker in an amount of from about 0 to about 10% by weight, preferably from about 0.5% to about 5% by weight, more preferably from about 0.5% to 2% by weight.

In another preferred embodiment of the invention, an ink formulation comprises: a solvent in an mount of from about 60% and 99% by weight, preferably from about 70% and 95% by weight, more preferably from about 84% and 94% by weight; a binder polymer in an amount of from about 1% to about 30% by weight, preferably from about 1% to about 15% by weight, more preferably from about 5% to about 10% by weight; a colorant in an amount of from about 0 to about 15% by weight, preferably from about 0.5% to about 8% by weight, more preferably from about 0.5% to 5% by weight; a crosslinker in an amount of from about 0 to about 10% by weight, preferably from about 0.5% to about 5% by weight, more preferably from about 0.5% to 2% by weight; and a surfactant in an amount of from about 0 to about 2% by weight, preferably from about 0.1% to about 0.5% by weight, more preferably from about 0.2% to about 0.4% by weight.

In another preferred embodiment of the invention, an ink formulation comprises: an ink formulation comprises: a solvent in an mount of from about 60% and 99% by weight, preferably from about 70% and 95% by weight, more preferably from about 84% and 94% by weight; a binder polymer in an amount of from about 1% to about 30% by weight, preferably from about 1% to about 15% by weight, more preferably from about 5% to about 10% by weight; a colorant in an amount of from about 0 to about 15% by weight, preferably from about 0.5% to about 8% by weight, more preferably from about 0.5% to 5% by weight; a crosslinker in an amount of from about 0 to about 10% by weight, preferably from about 0.5% to about 5% by weight, more preferably from about 0.5% to 2% by weight; a surfactant in an amount of from about 0 to about 2% by weight, preferably from about 0.1% to about 0.5% by weight, more preferably from about 0.2% to about 0.4% by weight; and a humectant in an amount of from about 0 to about 30% by weight, preferably from about 1% to about 15% by weight, more preferably from about 1% to about 7% by weight.

In another aspect, the present invention provides a method of preparing an inkjet ink. The method of the invention comprises grinding a pigment in a liquid mixture comprising water and a binder polymer. The binder polymer can be a poly(vinyl alcohol) or a derivative thereof, preferably a crosslinkable polymer which is a derivative of a poly(vinyl alcohol) having a molecular weight of at least about 2000 which comprises from about 0.5 to about 80%, based on the number of hydroxyl groups in the poly(vinyl alcohol), of units of the formula I, I and II, I and III, or I and II and III.

"Grinding of pigments" refers to a process in which the size of the pigments are reduced. Grinding of pigments can be carried out according to a standard grinding technique to reduce the pigment's particle size. Preferred methods include: high speed mixers, Kady Mills, colloid mills, homogenizers, microfluidizers, sonalators, ultrasonic mills, roll mills, ball mills, roller mills, vibrating ball mills, attritors, sand mills, varikinetic dispensers, three-roll mills, Banbury mixers, or other techniques known to those skilled in the art (see Ross S and Morrison I D, *Colloidal Systems and Interfaces*. New York: John Wiley & Sons, 1988.) More preferably, pigments are grounded using a vertical ball mill. Vertical ball mill is an efficient particle size reduction method, since it applies both shearing and impact forces. A preferred embodiment of the vertical ball mill is an attritor grinding system comprising a milling impeller, a shaft, a drive mixer and a container comprising beads having a diameter of about 1.6-2.5 mm.

The previous disclosure will enable one having ordinary skill in the art to practice the invention. In order to better enable the reader to understand specific embodiments and the advantages thereof, reference to the following non-limiting examples is suggested. However, the following examples should not be read to limit the scope of the invention.

EXAMPLE 1

This example illustrates how to prepare a master batch of an ink.

A master batch of black ink is prepared by grinding 87 g (30% by weight) iron oxide black (pigment), 40.9 g (14%) nelfilcon (acrylated-poly(vinyl alchohol) and 162.1 g (56%) water with an attritor grinding system. The attritor grinding system is developed using a solid Teflon single milling impeller (EMS T60, BYK Gardner) connected to ⅜" stainless steel shaft. The shaft is driven by an Arrow 6000 1/10 hp direct drive mixer. Approximately 200 ml Zirconia beads (1.6-2.5 mm diameter, BYK Gardner) are placed in a 500 ml stainless steel water-jacketed container (500 ml capacity, BYK Gardner) along with the Teflon impeller head Typical impelling speed is 2200 rpm. The pigment (iron oxide black) is added, followed by the nelfilcon and the water. The impeller speed is set at 1000 rpm and allowed to grind over a 72 hours period. The beads are removed by pouring the resulting liquid through a mesh.

A master batch of white ink is prepared by grinding 43.5 g (15%) titanium dioxide, 49.6 g (17%) nelfilcon and 196.9 g (68%) water using the above-described attritor grinding system according the above-described grinding procedure.

A master batch of PCN blue ink is prepared by grinding 32 g (11.7%) PCN blue, 51.5 g (18.9%) nelfilcon and 189.3 g (69.4%) water using the above-described attritor grinding system according the above-described grinding procedure.

A master batch of black ink, a master batch of white ink and a master batch of PCN blue ink are also prepared by grinding pigments in ethyl lactate or IPA (isopropanol) for 72 hours with a ball mill (ceramic balls). Nelfilcon is then added and mixed to the slurries for 1 hour.

Particle size analysis is carried out using the Horiba LA-920 particle analyzer on a Windows platform. The refractive ratio index used was 1.04 for PCN blue/water, 1.82 for iron oxide black/water and 1.49 for titanium dioxide/water.

Viscosity measurements are performed using the Brookfield LVTDV-II at 25° C., 60 rpm with a spindle 16.

It has been discovered that a nelfilcon/water medium provided a good grinding medium for the PCN blue, iron oxide black and titanium dioxide using the vertical mill set up (the attritor grinding system). The attritor did show a reduction in the particle size for all three pigments, but with different efficiencies.

About 96% of PCN blue pigment particles obtained with the vertical mill are less than 1 micron. Ultrasonication of the mixture does not result in a noticeable reduction in particle size, indicating that the suspension is relatively stable.

When using ball mill to grind PCN blue pigment in ethyl lactate or in IPA and then suspending in nelfilcon, there is a larger distribution of particle size and reduction in size after ultrasonication of the mixture. Viscosity of this ink paste (1.5% PCN blue) is 1030 cps.

After grinding with the vertical mill for 72 hours, the size of Iron oxide black particles decreases from an average of about 3.4 microns to 2.6 microns. But, there is aggregation. After ultrasonication of the mixture, the particle size decreases to an average of about 0.5 micron (with 75% of particles less than 1 micron). This indicates that the suspension is less stable than the PCN ink. The viscosity of the final mixture (30% iron oxide) is 1740 cps.

After grinding with the ball mill in ethyl lactate and then suspending in nelfilcon, the size of Iron oxide black particles is about 3.7 microns in average. Ultrasonication of the mixture reduces the particle size to an average of 1.2 microns (33% of the particles less than 1 micron). When the iron oxide black is ground in IPA and then suspended in nelfilcon, the particle size is smaller, about 1.8 micron in average. After sonication the particle size is reduced to an average of 0.6 micron (71% of the particles less than 1 micron).

After grinding in a nelfilcon/water medium with the vertical mill for 72 hours, the size of titanium dioxide particles is about 1.9 microns in average. Ultrasonication can reduce the particle size to an average of 1 micron (only 43% of the particles are less than 1 micron). After grinding titanium dioxide in ethyl lactate with a ball mill, the particle size is decreased to an average of 3.1 microns. Ultrasonication reduces the particle size to an average of 1.2 microns (34% of the particles less than 1 micron). When grinding titanium dioxide in IPA with a ball mill, the particle size is about 1.7 microns in average. Ultrasonication reduces the particle size to about 1 micron (44% of the particles less than 1 micron). When time for grinding titanium dioxide in nelfilcon/water media with the vertical mill is increased from 1 day to 6 days, the particle size is decreased from an average of 5.2 micron to an average of 1.8 micron (before sonication). The particle size can not be decreased any further after the sixth day.

The ink prepared in nelfilcon/water media shows foaming, but defoaming occurs after standing for 24 hours. Foaming can be reduced by addition of a small amount of surfactant, such as Surfynol 420, IPA or ethyl lactate.

The PCN blue pigment remains in suspension for more than a week in every ink sample (nelfilcon/water; nelfilcon/water/ethyl lactate; nelfilcon/water/IPA) and for more than three weeks in the nelfilcon/water medium.

The two inorganic pigments, iron oxide and titanium dioxide, appear more difficult to grind to small particles and their suspensions were less stable. At high viscosity (~1000 cps), precipitation of both iron oxide and titanium dioxide occurs in a couple of days, while at lower viscosity (~100-300 cps) in a few hours.

EXAMPLE 2

A water-based cyan inkjet ink (A1) is prepared from a master batch of PCN ink as prepared in Example 1 (11.7% PCN blue, 18.9% nelfilcon and 69.4% water). The cyan inkjet ink having a composition of 7.8% nelfilcon, 1% PCN blue, and 90.2% water is prepared by dilution the maser batch of PCN ink with water or nelfilcon prepolymer. This inkjet ink has a surface tension of 43.5 mN/m and a viscosity of 11.90 cPs.

Ink A1 is jetted using a 50 μm MicroFab inkjet head. Continuous jetting is possible using a square pulse, 1100 Hz, 60 V pp, 32.8 μsec pulse width. Ligaments, satellites and other jetting instabilities are observed. Such jetting instability typically provides poor print quality, resulting in stray lines, drops, or smears.

To study effects of surface tension on the printing quality of a color pattern on a polypropylene mold, surface tension is adjusted by adding different amounts of IPA while varying the amount of water in cyan inkjet inks. As shown in Table 1, as the amount of IPA in an ink increases, surface tension decreases while the viscosity increases. When the amount of IPA reaches 70%, precipitation is observed.

Viscosity measurements are done using the Brookfield LVTDV-II at 25° C., 60 rpm with the spindle 18. Dynamic surface tension measurements are done using the Dynamic Contact Angle Analyzer (CAHN model DCA-322) The instrument is verified with water (72 dynes/cm).

TABLE 1

Ink formulations and experimental data for IPA as additive

| Formulation # | % nelfilcon | % PCN blue | % water | % IPA | Viscosity | Surface tension |
|---|---|---|---|---|---|---|
| A1 | 7.8 | 1.00 | 91.20 | 0.00 | 11.90 cps | 43.50 mN/m |
| A2 | 7.8 | 1.00 | 72.95 | 18.25 | 27.90 cps | 32.20 mN/m |
| A3 | 7.8 | 1.00 | 54.70 | 36.50 | 39.70 cps | 26.51 mN/m |
| A3 | 7.8 | 1.00 | 36.45 | 54.75 | 34.90 cps | 25.01 mN/m |
| A5 | 7.8 | 1.00 | 21.20 | 70.00 | Precipitates | // |

The surfactant Surfynol 420 is used to reduce foaming in cyan inkjet inks. As shown in Table 2, when Surfynol 420 is present in the inks at a concentration from 0.07% to 0.3% (by weight), foaming can be eliminated while the surface tension of the ink is decreased and the viscosity remains relatively constant.

TABLE 2 ink formulations and experimental data for Surfynol 420 as additive.

| Formulation # | % nelfilcon | % PCN blue | % water | % Surfynol 420 | Viscosity | Surface tension |
|---|---|---|---|---|---|---|
| B1 | 6.00 | 1.00 | 93.00 | 0.00 | 7.01 cps | 56.45 mN/m |
| B2 | 6.00 | 1.00 | 92.92 | 0.07 | 7.61 cps | 37.54 mN/m |
| B3 | 6.00 | 1.00 | 92.85 | 0.15 | 6.85 cps | 33.57 mN/m |
| B4 | 6.00 | 1.00 | 92.77 | 0.22 | 7.01 cps | 31.58 mN/m |
| B5 | 6.00 | 1.00 | 92.70 | 0.30 | 7.60 cps | 30.44 mN/m |

Color patterns are printed on polypropylene male mold for making FreshLook lenses with the above inks (inks A2 to A5 and B1 to B5) using a 50 μm MicroFab inkjet head. It is observed that the inks with lower surface tension allow easier jet control, but "coffee stain" effect can be noticed. The "coffee stain" effect may be due to a non-uniform distribution of the ink in the drop; the central section of the drops looks lighter than the edges (doughnut shape). Those inks with low surface tension can be used to print lines, but may not be suitable for printing multi-segment because of clogging of the nozzle due to fast drying of the ink.

To avoid clogging of the nozzle, high boiling solvents, like glycerol and diethyleneglycol, are added in the cyan inks. As shown in Table 3, surface tension values remain relatively constant in the presence of glycerol and diethyleneglycol and the viscosity increases with decreasing water content in the ink.

TABLE 3

Formulations and experimental data for glycerol and diethyleneglycol as additives

| Formulation # | % nelfilcon | % PCN blue | % water | % Surfynol 420 | % glycerol | % di-ethylene-glycol | Viscosity cps | Surface tension dynes/cm |
|---|---|---|---|---|---|---|---|---|
| C1 | 6.00 | 1.00 | 92.85 | 0.15 | 0.00 | 0.00 | 7.10 | 30.82 |
| C2 | 6.00 | 1.00 | 90.85 | 0.15 | 2.00 | 0.00 | 7.57 | 30.67 |
| C3 | 6.00 | 1.00 | 85.35 | 0.15 | 0.00 | 7.50 | 8.42 | 31.20 |
| C4 | 6.00 | 1.00 | 83.35 | 0.15 | 2.00 | 7.50 | 9.57 | 31.04 |
| C5 | 6.00 | 1.00 | 88.10 | 0.15 | 1.00 | 3.75 | 8.52 | 31.07 |

The inks containing a higher amount of glycerol or diethyleneglycol take a longer period of time to dry on the molds. Those inks require a longer drying time before filling molds with polymerizable solution. If filling of molds with polymerizable solution (nelfilcon) without an appropriate delay time, smearing can be observed and the transferring of the printed color pattern from molds to lenses may not be completed. Results show that among all inks listed in Table 3, ink C5 (6.00% nelfilcon, 1.00% PCN blue, 88.10% water, 0.15% surfynol 420, 1.00% glycerol, 3.75% diethyleneglycol) has the best jettability and produces a print with best quality and best transferability (from a mold to a lens). With ink C5, drops are well defined on the molds and no "coffee stain" effect is observed. Overprinting shows no drop mixing, nearly a layer effect. Printing of segments is possible by jetting while the mold was moved to another position. Stopping the jetting may result in temporary clogs. Such potential problem can be avoided by keeping the meniscus vibrating in the print head with a secondary waveform as disclosed in copending U.S. application (U.S. application Ser. No. 10/797,707) and U.S. Pat. No. 4,266,232.

It has also been discovered that jetting stability of an ink can also be improved by varying jetting parameters such as jetting control signals of print head. For example, the jetting of these inks is improved by changing control signal, waveform from a simple square pulse to a bipolar pulse (dwell 38 μsec, echo 38 μsec) at ~1000 Hz and 80 V pp. This type of pulse improves the jet quality by elimination of ligaments and satellites.

Table 4 shows nine ink formulations having a higher color intensity (2% PCN blue) and containing glycerol varying from 0 to 2% and diethylene glycol varying from 1 to 3.75%. These inks are prepared from a master batch of ink (11.7% PCN blue, 18.9% nelfilcon and 69.4% water), which is prepared as described in Example 1, by diluting the master batch with water or nelfilcon and by addition of the other additives (Surfynol 420, glycerol and diethylene glycol). All percentage values are expressed in weight percent.

TABLE 4

Ink formulations. % weight

| run | nelfilcon | PCN blue | Surfynol 420 | glycerol | diethylene glycol | water |
|---|---|---|---|---|---|---|
| D1 | 6.00 | 2.00 | 0.15 | 0.00 | 1.00 | 90.85 |
| D2 | 6.00 | 2.00 | 0.15 | 1.00 | 1.00 | 89.85 |
| D3 | 6.00 | 2.00 | 0.15 | 2.00 | 1.00 | 88.85 |

TABLE 4-continued

Ink formulations. % weight

| run | nelfilcon | PCN blue | Surfynol 420 | glycerol | diethylene glycol | water |
|---|---|---|---|---|---|---|
| D4 | 6.00 | 2.00 | 0.15 | 0.00 | 2.00 | 89.85 |
| D5 | 6.00 | 2.00 | 0.15 | 1.00 | 2.00 | 88.85 |
| D6 | 6.00 | 2.00 | 0.15 | 2.00 | 2.00 | 87.85 |
| D7 | 6.00 | 2.00 | 0.15 | 0.00 | 3.75 | 88.10 |
| D8 | 6.00 | 2.00 | 0.15 | 1.00 | 3.75 | 88.10 |
| D9 | 6.00 | 2.00 | 0.15 | 2.00 | 3.75 | 87.10 |

The clogging properties of these nine inks are tested on a single nozzle head (50 μm Microfab inkjet head) using a bipolar pulse (dwell 38 μsec/+50 V, echo 38 μsec/−20V) at 65 Hz. To perform this "down time" test, the printer is shut down for 5, 10 and 15 minutes. Once the printer is turned on again, the time necessary to obtain the first drop of the jet is monitored. Tests are repeated at least three times: after every experiment, a burst of ink was jetted to clean the nozzle and reset the meniscus to the initial conditions.

Results indicate that ink formulations with higher water contents have a shorter restart time. Formulations containing more than 3% by weight of total humectants (diethylene glycol+glycerol) clogs the nozzle the fastest. However, some diethylene glycol is necessary to eliminate the "coffee stain" effect. The use of a prime waveform at high frequency during the "down time" can totally eliminate the clogging problem.

All inks are tested for ink's ability to adhere to contact lenses and to transfer color patterns from molds to lenses in a series of rub tests. All lenses are made by polymerizing nelfilcon in standard −3.00 D FreshLook molds (made of polypropylene). The female mold is filled with 100 μl of nelfilcon using an Eppendorf multipipettor. The male mold is press fit over the female and compressed to ~24 psi. The lenses are cured with Dr. Gröbel's light source (UV-LQ 400/C, a high-pressure mercury arc lamp) for 7 seconds at ~0.5 cm. For Dr. Gröbel's light source, a condenser and a 305 nm cut-off filter is placed in front of the light source.

After curing, the molds are opened and the lenses are placed in a hydration solution for approximately 30 seconds. The lenses are pealed off the male side and stored in a packaging solution. Autoclaving is done using a tabletop heat sterilizer (typical cycle time 125° C. for 45 minutes).

Initial rub tests are done by removing the hydrated lens from the packaging solution and digitally rubbing the lens between either two fingers or a finger and a palm for approximately 10 seconds. Visible and microscopic (~10×) observation of colorant bleeding, smearing, or delamination indicates failure of the rub test.

Subsequent rub tests are done by removing the hydrated lens from the packaging solution and insertion into a vial of methanol. The vial is sonicated for 30 seconds using a standard laboratory sonicator. The lens is removed from the methanol and placed back into the packaging solution. A rub test is performed. Observation of delamination indicates failure of this test.

All inks remain adhered to the cured contact lens, after hydration, packaging, autoclaving, and a vigorous digital rubbing procedure.

EXAMPLE 3

FreshLook male polypropylene molds are printed with a PCN ink (6% nelfilcon as binder, 1% PCN blue as colorant, 0.15% Surfynol 420 as surfactant, 1% glycerine and 3.75% diethylene glycol as humectants, 88.10% water). A FreshLook color pattern is produced on each male molds using an ink jet printing system as described in a co-pending U.S. patent application (U.S. application Ser. No. 10/797, 707). The ink jet printing system comprises a 50 μm Microfab print head that can be positioned precisely at predetermined position by moving the male mold under control of a computer along three axes. The male mold can be moved linearly, moved toward to or away from the print head along a translational axis, rotated around a rotational axis which passes through the apical center of the curvature surface of the male mold in normal direction, or tilted around a tilting axis.

The molds are corona treated before and after printing to check if the treatment is affecting the printing quality and the transfer of the ink from the molds to the lenses. The corona jet machine is set up to obtain a surface tension between 32 and 34 dynes/cm. Corona treatment of the printed cups does not affect the quality of the print or the transfer of the ink to the lens. However, corona treatment of the cups before printing can affect the quality of the print, showing larger drop spreading.

All lenses are made by polymerizing a polymerizable composition (50.450% HEMA; 4.970% EOEMA; 1.200% EDMA; 1.000% MAA; 0.280% VAZO 64; 42.100% IPA) in polypropylene molds. VAZO-64 (2,2'-azobisisobutyronitrile) is obtained from Aldrich. The amounts in the composition are in weight percent as present in final formulation. 250 μl of the polymerizable composition is added into the female molds, then one male molds having a FreshLook pattern printed thereon is press-fit over each female mold and compressed to about 24 psi. The ink does not smear in presence of the polymerizable composition (solution) more than 24 hours after filling and before curing. The polymerizable composition in a mold is thermally cured in an oven to form a lens. The thermal curing cycle is done under nitrogen at 65° C. for 45 minutes, then at 100° C. for 30 minutes. Molds are opened and the lenses are dried at 85° C. for 45 minutes, then demolded, hydrated and autoclaved as explained before. The transfer of the ink is complete and the pattern definition is retained. The lenses do not show surface defects.

Adhesion tests (rub tests) are performed in accordance with the procedures described in Example 2. All the lenses pass the adhesion test, before and after autoclaving.

Similar results are obtained using an ink formulation containing double amount of colorant (2% PCN blue). This ink passed the adhesion test as described above.

EXAMPLE 4

A master batch of the magenta ink is prepared by grinding 34.8 g (12%) Red 122 (obtained from Sun Chemical), 26.1 g (9%) nelfilcon and 229.1 g (79%) water for about 24 hours with the attritor grinding system described in Example 1. Red 122 is added first, followed by the nelfilcon and water. The master batch is stored in a Nalgene bottle at room temperature until needed. The master batch remained a liquid throughout the experiments.

Particle size analysis is done using the Horiba LA-920 particle analyzer on a Windows platform. The refractive ratio index used was 1.53 for Red 122/water. Viscosity measurements are done using the Brookfield LVTDV-II at 25° C., 60 rpm with a spindle 18. Dynamic surface tension measurement are done using the Dyanmic Contact Angle Analyzer CAHN DCA-322. The instrument is verified with water (surface tension: 72 dynes/cm).

A 50 μm MicroFab head is used for all the experiments. A bipolar function (38 μsec dwell, 38 μsec echo) is used for all the jetting experiments with a voltage ~3.8 Vpp and a frequency ~1000 Hz. FreshLook polypropylene molds are used for printing, by sliding them in front of the nozzle at a speed of 150 mm/sec. Images of the jet are taken with a camera connected to a stroboscopic LED light. Images of the printed molds are taken using a camera with magnifier lens and connected to a software system.

All lenses are made by polymerizing nelfilcon in FreshLook molds. The female mold is filled with ~100 μl nelfilcon using an Eppendorf multipipettor. The printed male mold is press fit over the female and compressed to ~24 psi. The lenses are cured with Dr. Gröbel light source (UV-LQ 400/C, a high pressure mercury arc lamp). The irradiation time is adjusted to have a UV dose of 22 mJ/cm$^2$ with the UV intensity measured before every set of experiments (~2-2.5 mW/cm$^2$). After curing, the molds are opened, the lenses are pealed off from the male side and stored in packaging solution. Autoclaving is done using a tabletop heat sterilizer (typical cycle time 125° C. for 45 minutes).

The particle size analysis of the original sample shows a large distribution of the particles between 0.2 and 20 μm. Only after few hours of grinding more than 96% of the particles are less than 0.6 μm. Ultrasonication of the ink does not result in any noticeable reduction in particle size, indicating that the suspension is relatively stable. The Red 122 remains suspended for many weeks. Foaming occurs in the master batch after the grinding step but disappear in a few hours by standing.

The master batch formulation (12% Red 122, 9% nelfilcon, 79% water) has a viscosity of 43.8 cps. Inks are prepared from this master batch by adding nelfilcon (or water) and Surfynol 420 and listed in Tables 5-6. All inks are stable for at least three weeks.

All inks listed in Table 5 can be jetted by a print head without ligaments and satellites. Most inks show poor transfer from the mold to the lens and poor adhesion, during hydration. Ink E7 (containing 7.8% nelfilcon and 2.8% pigment) shows good transfer and good adhesion, even after autoclave.

TABLE 5

Magenta ink formulations tested for transfer and adhesion

| Formulation # | Wt % nelfilcon | Wt % red 122 | Viscosity cps | Transfer | adhesion |
|---|---|---|---|---|---|
| E1 | 5.70 | 7.62 | 8.02 | Partial | no |
| E2 | 5.52 | 4.80 | 7.67 | Partial | no |
| E3 | 5.70 | 1.00 | 5.66 | Total | partial |
| E4 | 6.30 | 5.00 | 9.10 | Partial | Partial |
| E5 | 9.00 | 4.50 | 19.9 | Partial | no |
| E6 | 7.80 | 6.30 | 16.3 | Partial | no |
| E7 | 7.80 | 2.80 | 11.6 | Total | yes |
| E8 | 7.50 | 5.00 | 14.1 | Partial | no |

Addition of a surfactant, Surfynol 420, improves jet qualities (no foam) and transfer from mold to lens. Inks listed in Table 6 adheres completely to the lens before and after autoclave.

TABLE 6

Formulations with Surfynol 420 as additive.

| Formulation # | % nelfilcon | % Red 122 | % water | % Surfynol | Viscosity cps | Surface tension dynes/cm |
|---|---|---|---|---|---|---|
| F1 | 7.80 | 2.80 | 89.40 | 0.00 | 13.00 | 49.94 |
| F2 | 7.80 | 2.80 | 89.33 | 0.07 | 13.20 | 37.35 |
| F3 | 7.80 | 2.80 | 89.35 | 0.15 | 13.40 | 34.10 |
| F4 | 7.80 | 2.80 | 89.27 | 0.22 | 13.10 | 30.65 |
| F5 | 7.80 | 2.80 | 89.20 | 0.30 | 13.30 | 29.22 |

EXAMPLE 5

A master batch of the yellow ink is prepared by grinding 34.8 g (12%) Yellow 154 (yellow 154 (Symuler Fast yellow 4192) from Sun Chemical, 26.1 g (9%) nelfilcon and 229.1 g (79%) water for about 24 hours with the attritor grinding system described in Example 1. Yellow 154 is added first, followed by nelfilcon and water. The master batch is stored in a Nalgene bottle at room temperature until needed. The master batch remains a liquid throughout the experiments.

Particle size analysis is done using the Horiba LA-920 particle analyzer on a Windows platform. The refractive ratio index used was 1.53 for yellow 154/water. Viscosity measurements are done using the Brookfield LVTDV-II at 25° C., 60 rpm with the spindle 18. Dynamic surface tension measurements are done using the Dynamic Contact Angle Analyzer (CAHN modelDCA-322) The surface tension of water is verified to be 72 dynes/cm prior to testing.

A 50 μm MicroFab head is used for all the experiments. A bipolar function (waveform) (38 μsec dwell, 38 μsec echo) is used for all the jetting experiments using a voltage of −3.2 Vpp and a frequence ~1000 Hz. FreshLook polypropylene molds are used for printing, by sliding them in front of the nozzle at a speed of 150 mm/sec. Images of the jet are taken with a camera connected to a stroboscopic LED light. Images of the printed molds are taken using a camera with magnifier lens and connected to a software system.

All lenses are made by polymerizing nelfilcon in FreshLook molds. The female mold is filled with ~100 μl nelfilcon using an Eppendorf multipipettor. The printed male mold is press fit over the female and compressed to ~24 psi. The lenses are cured with Dr. Gröbel light source (UV-LQ 400/C, a high pressure mercury arc lamp). The irradiation time is adjusted to have an UV dose of 22 mJ/cm$^2$ with the UV intensity measured before every set of experiments (~2-2.5 mW/cm$^2$). After curing, the molds are opened, the lenses are peeled off from the male side and stored in PBS packaging solution. Autoclaving is done using a tabletop heat sterilizer (typical cycle time 125° C. for 45 minutes).

The particle sizes of the original sample are distributed between 0.5 and 100 μm. After ultrasonication of the sample, the particles size is determined to be within a narrower distribution range with 70% of the particles less than 1 μm. After 3 hours of grinding more than 96% of the particles was less than 1 μm. Ultrasonication of the master batch ink does not result in a reduction in particle size, indicating that the suspension is stable. Yellow 154 particles remain suspended for many weeks. Foaming occurs in the master batch after the grinding step, but the foam disappears in a few hours by standing.

The master batch formulation (12% Yellow 154, 9% nelfilcon, 79% water) has a viscosity of 33.4 cps. Various ink formulations are prepared from this master batch of the yellow ink. These inks have a viscosity between 8 and 11 cps, an amount of pigment in the range from about 1% to 8%. All ink formulations can be jetted by a 50 μm MicroFab head using a bipolar waveform to control jetting of the ink. There are no ligaments or satellites. Color intensity is high with the formulations containing from about 4.5% to about 8% of Yellow 154. The inks containing 1 and 2.75% pigment shows a too light color. The formulation containing 5.7% of nelfilcon and 4.5% pigment showed a poor ink transfer from the mold to the lens. All the other formulations containing more than 6.3% nelfilcon transferred completely. The inks with lower amounts of pigment (between 1% and 4.5%) shows good ink adhesion to lenses before and after autoclaving. The inks with higher loads of pigment (8%) or lower amounts of nelfilcon (4.8%) do not adhere to the lenses. Results of some inks are summarized in Table 7.

TABLE 7

Yellow ink formulations tested for color intensity, transfer and adhesion

| Formulation # | Wt % nelfilcon | Wt % yellow 154 | Viscosity cps | Transfer | adhesion |
|---|---|---|---|---|---|
| G1 | 7.50 | 1.00 | 10.50 | Total | yes |
| G2 | 6.60 | 2.75 | 9.30 | Total | yes |
| G3 | 5.70 | 4.50 | 7.80 | Poor | no |
| G4 | 6.60 | 4.50 | 9.90 | Total | yes |
| G5 | 6.60 | 8.00 | 11.40 | Partial | no |

Tables 8 and 9 shows ink formulations containing a surfactant, Surfynol 420, and their ink properties. Surfynol 420 can decrease the surface tension of a yellow ink and eliminate foaming. But, when the amount of Surfynol 420 is higher than 0.07%, the surface tension of ink remains relatively constant (~30 dynes/cm), since the CMC of Surfynol 420 is reached. Viscosity does not change with Surfynol 420 concentration.

TABLE 8

Properties of yellow ink formulations containing Surfynol 420

| Formulation # | % nelfilcon | % Yellow 154 | % water | % Surfynol | Viscosity cps | Surface tension dynes/cm |
|---|---|---|---|---|---|---|
| H1 | 6.6 | 4.5 | 88.90 | 0.00 | 8.32 | 50.71 |
| H2 | 6.6 | 4.5 | 88.83 | 0.07 | 8.02 | 34.10 |
| H3 | 6.6 | 4.5 | 88.75 | 0.15 | 8.42 | 30.78 |
| H4 | 6.6 | 4.5 | 88.78 | 0.22 | 9.02 | 30.03 |
| H5 | 6.6 | 4.5 | 88.70 | 0.30 | 8.60 | 30.16 |

TABLE 9

Properties of yellow ink formulations containing Surfynol 420

| Formulation # | % nelfilcon | % yellow 154 | % water | % Surfynol | Viscosity cps | Surface tension dynes/cm |
|---|---|---|---|---|---|---|
| J1 | 6.6 | 6.5 | 87.00 | 0.00 | 9.60 | 50.86 |
| J2 | 6.6 | 6.5 | 86.93 | 0.07 | 9.72 | 35.19 |
| J3 | 6.6 | 6.5 | 86.85 | 0.15 | 9.72 | 30.65 |
| J4 | 6.6 | 6.5 | 86.78 | 0.22 | 9.67 | 30.41 |
| J5 | 6.6 | 6.5 | 86.70 | 0.30 | 10.00 | 30.35 |

What is claimed is:

1. An ink comprising: a solvent; a colorant; and a binder polymer, wherein the colorant comprises pigments, wherein the binder polymer is a polymer which comprises multiple olefinically unsaturated groups and is capable of being crosslinked under free radical polymerization conditions in the absence of a crosslinker to form inter- and intra crosslinkages so that a macromolecular matrix is formed to bind and/or trap pigments onto a soft contact lens and to ensure no visible and microscopic (~10×) observation of colorant bleeding, smearing, or delamination in a color image printed on the contact lens with said ink, wherein each intra-crosslinkage is an intramolecular covalent bond formed between a pair of olefinically unsaturated groups which belong to the same binder polymer molecule, wherein the inter-crosslinkage is an intermolecular covalent bond formed between a pair of olefinically unsaturated groups each belonging to one of two binder polymer molecules, wherein the ink is characterized by having a surface tension of from about 20 mN/m to about 60 mN/m, a viscosity of less than 50 centipoise, and good adhesion to a soft contact lens and by being stable for at least about 4 hours, wherein a color image printed on the soft contact lens with said ink passes a sterilization surviving test, and wherein the binder polymer is a cellulosic resin, polyester, polyurethane, polyurea, or polyamides, wherein the amount of the solvent is from about 60% to 99% by weight, wherein the amount of the binder polymer is from about 1% to about 30% by weight, and wherein the amount of the colorant is from about 0 to about 15% by weight.

2. The ink of claim 1, wherein the sterilization test is an autoclave-surviving test.

3. The ink of claim 1, wherein said ink can be used to print a color image on the medical device by using an inkjet printing system.

4. The ink of claim 1, wherein the medical device is an ophthalmic lens.

5. The ink of claim 4, wherein the ophthalmic lens is a contact lens.

6. The ink claim 4, wherein the colorant comprises at least a pigment and/or at least a dye which is either sparingly soluble or insoluble in the solvent.

7. The ink of claim 6, wherein the colorant comprises at least a pigment and optionally a dye.

8. The ink of claim 6, wherein the pigment is selected from the group consisting of Pigment Yellow 1, Pigment Yellow 3, Pigment Yellow 34, Pigment Yellow 35, Pigment Yellow 37, Pigment Yellow 40, Pigment Yellow 53, Pigment Yellow 65, Pigment Yellow 83, Pigment Yellow 95, Pigment Yellow 97, Pigment Yellow 108, Pigment Yellow 110, Pigment Yellow 120, Pigment Yellow 138, Pigment Yellow 139, Pigment Yellow 150, Pigment Yellow 151, Pigment Yellow 153, Pigment Yellow 154, Pigment Yellow 175, Pigment Yellow 184, Pigment Red 60, Pigment Red 83, Pigment Red 88, Pigment Red 122, Pigment Red 171, Pigment Red 176, Pigment Red 177, Pigment Red 202, Pigment Red 264, Natural Pigment Red 4, Natural Pigment Red 9, Pigment Violet 11, Pigment Violet 19, Pigment Violet 42, Pigment Blue 15:1, Pigment Blue 15:3, Pigment Blue 15:6, Pigment Blue 16, Pigment Blue 17, Pigment Blue 27, Pigment Blue 28, Pigment Blue 29, Pigment Blue 33, Pigment Blue 35, Pigment Blue 36, Pigment Blue 60, Pigment Blue 72, Pigment Blue 73, Pigment Blue 74, Pigment Black 1, Pigment Black 6, Pigment Black 7, Pigment Black 8, Pigment Black 9, Pigment Black 10, Pigment Black 11, Pigment Black 19, Pigment Black 31, Pigment White 4, Pigment White 6, D&C Blue No. 6, D&C Green No. 6, D&C Violet No. 2, carbazole violet, phthalocyanine green, copper complexes, chromium oxides, iron oxides, phthalocyanine blue, titanium dioxides, cobalt blue, Toner cyan BG, Permajet blue B2G, chromium sesquioxide, and Monolith black C-K.

9. The ink of claim 6, wherein the solvent is one or more organic solvents.

10. The ink of claim 9, wherein the organic solvents are selected from the group consisting of acetone, methanol, ethanol, propanol, isopropanol, glycols, ketones, esters, cyclopentanone, cyclohexanone, tetrahydrofuran, acetone, methyl-2-pyrrolidone, dimethyl formamide, acetophenone, methylene dichloride, dimethyl sulfoxide, gamma-butyrolactone, ethylene dichloride, isophorone, o-dichlorobenzene, tetrahydrofuran, diacetone alchol, methyl ethyl ketone, acetone, 2-nitropropane, ethylene glycol monoethyl ether, propylene carbonate, cyclohexanol, chloroform, trichloroethylene, 1,4-dioxane, ethyl acetate, ethylene glycol monobutyl ether, chlorobenzene, nitroethane, ethylene glycol monomethyl ether, butyl acetate, 1-butanol, methyl isobutyl ketone, nitromethane, toluene, ethanol, diethylene glycol, benzene, diethyl ether, ethanolamine, carbon tetrachloride, propylene glycol, hexane, ethylene glycol, and formamide.

11. The ink of claim 1, wherein the solvent which is methyl ethyl ketone, cyclohexanone, cyclopentanone or a mixture of thereof.

12. The ink of claim 1, wherein the ink has a good transferability from a mold to a medical device molded in the mold.

13. The ink of claim 1, wherein the ink is stable for at least 8 hours.

14. The ink of claim 1, wherein the ink is stable for at least 24 hours.

15. The ink of claim 1, wherein the ink is stable for at least 2 days.

16. The ink of claim 13, wherein said ink can be used to print a color image on the medical device by using an inkjet printing system.

17. The ink of claim 1, wherein the ink further comprises 0 to 4% by weight glycerol and/or 0 to 15% by weight diethylene glycol.

18. The ink of claim 1, further comprising a crosslinker.

19. The ink of claim 18, wherein the crosslinker is selected from the group consisting of diaziridine-containing compounds, ethylene glycol dimethacrylate (EGDMA), diethylene glycol dimethacrylate, ethyleneglycol diacrylate, allyl methacrylates, allyl acrylates, 1,3-propanediol dimethacrylate, 1,6-hexanediol dimethacrylate, 1,4-butanediol dimethacrylate, polyethyleneoxide mono- and diacrylates, and 1,4-butanediol diacrylate (BDDA).

20. The ink of claim 18, wherein the amount of the crosslinker is from 0 to about 10% by weight.

21. The ink of claim 1, wherein the ink has a good transferability from a mold to an ophthalmic lens made from the mold.

22. The ink of claim 1, wherein the solvent is water or a mixture of water and one or more organic solvent.

23. The ink of claim 1, wherein the ink further comprises 0 to 2% by weight glycerol and/or 2% to 5% by weight diethylene glycol.

24. The ink of claim 1, wherein the ink further comprises one or more components selected from the group consisting of polymerization initiators, antimicrobial agents, antioxidant agents, and anti-kogating agents.

25. The ink of claim 24, wherein the ink is stable for at least 8 hours.

26. The ink of claim 23, wherein the ink is stable for at least 8 hours.

27. The ink of claim 26, wherein said ink can be used to print a color image on the medical device by using an inkjet printing system.

28. The ink of claim 1, wherein the binder polymer is a poly(vinyl alcohol).

29. The ink of claim 28, wherein the poly(vinyl alcohol) has a molecular weight of at least about 2000 and comprises from about 0.5 to about 80%, based on the number of hydroxyl groups in the poly(vinyl alcohol), of units of the formula I, I and II, I and III, or I and II and III

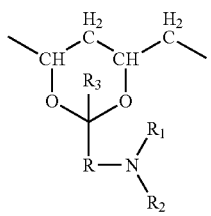

I in which R is alkylene having up to 12 carbon atoms, $R_1$ is hydrogen or lower alkyl, $R_2$ is an olefinically unsaturated, electron-withdrawing, crosslinkable radical, and $R_3$ is hydrogen, a $C_1$-$C_6$ alkyl group or a cycloalkyl group,

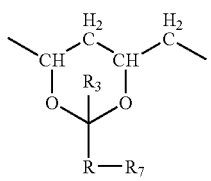

II wherein R and $R_3$ are as defined above, and $R_7$ is a primary, secondary or tertiary amino group or a quaternary amino group of the formula $N^+(R')_3 X^-$, in which each R', independently of the others, is hydrogen or a $C_1$-$C_4$ alkyl radical and X is a counterion,

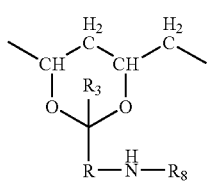

III in which R and $R_3$ are as defined above, and $R_8$ is the radical of a monobasic, dibasic or tribasic, saturated or unsaturated, aliphatic or aromatic organic acid or sulfonic acid.

30. The ink of claim 29, wherein $R_2$ is a radical of the formula IV or V

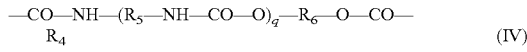

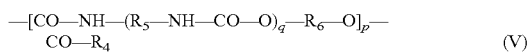

in which p and q, independently of one another, are zero or one, and $R_5$ and $R_6$, independently of one another, are lower alkylene having 2 to 8 carbon atoms, arylene having 6 to 12 carbon atoms, a saturated bivalent cycloaliphatic group having 6 to 10 carbon atoms, arylenealkylene or alkylenearylene having 7 to 14 carbon atoms or arylenealkylenearylene having 13 to 16 carbon atoms, and in which $R_4$ is an olefinically unsaturated copolymerizable radical having 2 to 24 carbon atoms.

31. The ink of claim 29, further comprising one or more components selected from the group consisting of a crosslinker, a surfactant, a humectant, a polymerization initiator, an antimicrobial agent, an antioxidant agent, and an anti-kogating agents.

32. The ink of claim 31, comprising at least one surfactant in an amount of from about 0 to about 2% by weight.

33. The ink of claim 32, wherein the surfactant is 2,4,7,9-tetramethyl-5-decyne-4,7-diol, ethoxylated 2,4,7,9-tetramethyl-5-decyne-4,7-diol, a mixture of 2,4,7,9-tetramethyl-5-decyne-4,7-diol and ethoxylated 2,4,7,9-tetramethyl-5-decyne-4,7-diol, or a block copolymer of ethylene oxide and propylene oxide.

34. The ink of claim 32, comprising a humectant in an amount of from about 0 to about 30% by weight.

35. The ink of claim 34, wherein the humectant is glycerol, ethylene glycol, diethylene glycol, 1,3-dioxane-5,5-dimethanol, or a mixture thereof.

36. The ink of claim 35, wherein the humectant is glycerol and/or diethylene glycol.

37. The ink of claim 31, comprising a crosslinker in an amount of from 0 to about 10% by weight.

38. The ink of claim 37, wherein the crosslinker is selected from the group consisting of diaziridine-containing compounds, ethylene glycol dimethacrylate (EGDMA), diethylene glycol dimethacrylate, ethyleneglycol diacrylate, allyl methacrylates, allyl acrylates, 1,3-propanediol dimethacrylate, 1,6-hexanediol dimethacrylate, 1,4-butanediol dimethacrylate, polyethyleneoxide mono- and diacrylates, and 1,4-butanediol diacrylate (BDDA).

39. The ink of claim 29, wherein the ink has a good transferability from a mold to a contact lens molded with the mold.

40. The ink of claim 39, wherein the ink is stable for at least 4 hours.

41. The ink of claim 40, wherein the ink is stable for at least 8 hours.

42. The ink of claim 41, wherein the ink is stable for at least 24 hours.

43. The ink of claim 42, wherein the ink is stable for at least 7 days.

44. The ink of claim 43, wherein the ink is stable for at least three weeks.

45. A method for making an inkjet ink, comprising grinding pigments in a liquid mixture comprising water and a binder polymer, wherein the binder polymer is a crosslinkable, water-soluble poly(vinyl alcohol) and comprises olefinically unsaturated groups which are capable of being crosslinked under free radical polymerization conditions in the absence of a crosslinker to form inter—and intra crosslinkages so that a macromolecular matrix is formed to bind and/or trap pigments onto a soft contact lens and to ensure no visible and microscopic (~10×) observation of colorant bleeding, smearing, or delamination in a color image printed on the soft contact lens with said ink, wherein each intra-crosslinkage is an intramolecular covalent bond formed between a pair of olefinically unsaturated groups which belong to the same binder polymer molecule, wherein the inter-crosslinkage is an intermolecular covalent bond formed between a pair of olefinically unsaturated groups each belonging to one of two binder polymer molecules, and wherein the ink is characterized by having a surface tension of from about 20 mN/m to about 60 mN/m, a viscosity of less than 50 centipoise, and good adhesion to the soft contact lens without and by being stable for at least about 4 hours.

46. The method of claim 45, wherein the crosslinkable, water-soluble poly(vinyl alcohol) has a molecular weight of at least about 2000 and comprises from about 0.5 to about 80%, based on the number of hydroxyl groups in the poly(vinyl alcohol), of units of the formula I, I and II, I and III, or I and II and III

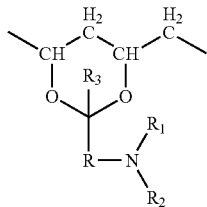

I in which R is alkylene having up to 12 carbon atoms, $R_1$ is hydrogen or lower alkyl, $R_2$ is an olefinically unsaturated, electron-withdrawing, crosslinkable radical, and $R_3$ is hydrogen, a $C_1$-$C_6$ alkyl group or a cycloalkyl group,

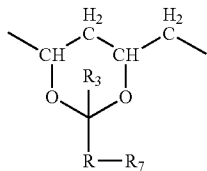

II wherein R and $R_3$ are as defined above, and $R_7$ is a primary, secondary or tertiary amino group or a quaternary amino group of the formula $N^+(R')_3X^-$, in which each R', independently of the others, is hydrogen or a $C_1$-$C_4$ alkyl radical and X is a counterion,

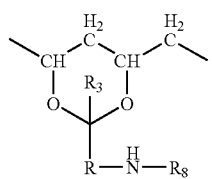

III in which R and $R_3$ are as defined above, and $R_8$ is the radical of a monobasic, dibasic or tribasic, saturated or unsaturated, aliphatic or aromatic organic acid or sulfonic acid.

47. The method of claim 46, wherein the grinding step is performed using a technique selected from the group consisting of high speed mixers, Kady Mills, colloid mills, homogenizers, microfluidizers, sonalators, ultrasonic mills, roll mills, ball mills, roller mills, vibrating ball mills, attritors, sand mills, varikinetic dispensers, three-roll mills, Ban bury mixers, and vertical mill.

48. The ink of claim 1, wherein said ink can be used to print a color image on the medical device by using an inkjet printing system.

49. The ink of claim 22, wherein the colorant comprises at least a pigment and/or at least a dye which is either sparingly soluble or insoluble in the solvent.

50. The ink of claim 22, wherein said ink can be used to print a color image on the medical device by using an inkjet printing system.

* * * * *